United States Patent

[11] 3,576,526

| [72] | Inventors | Ronald J. K. Arnold;<br>Robert L. Green; Howard M. Smith,<br>Sunbury-on-Thames, England |
|---|---|---|
| [21] | Appl. No. | 662,778 |
| [22] | Filed | Aug. 23, 1967 |
| [45] | Patented | Apr. 27, 1971 |
| [73] | Assignee | The British Petroleum Company Limited<br>London, England |
| [32] | Priority | Aug. 26, 1966 |
| [33] | | Great Britain |
| [31] | | 38,482/66 |

[54] DETECTION OF KNOCK IN INTERNAL COMBUSTION ENGINES
3 Claims, 6 Drawing Figs.

[52] U.S. Cl. .................................................. 340/52, 73/35
[51] Int. Cl. ..................................................... G01l 23/22

[50] Field of Search............................................. 340/52, 240, 241; 73/4, 35

[56] References Cited
UNITED STATES PATENTS

| 2,404,569 | 7/1946 | Eldredge et al............... | 73/35X |
| 2,475,377 | 7/1949 | De Bruin..................... | 73/35 |
| 2,530,931 | 11/1950 | Alexander................... | 73/35X |
| 3,201,972 | 8/1965 | Krause....................... | 73/35 |

*Primary Examiner*—Alvin H. Waring
*Attorney*—Morgan, Finnegan, Durham and Pine

ABSTRACT: An aural or visual indication of the presence of knock in a spark ignition engine is provided by extracting pressure-indicative signals from the combustion chambers and either feeding knock-indicative portions of the signals to an electroacoustic transducer or displaying the signals on a cathode-ray tube.

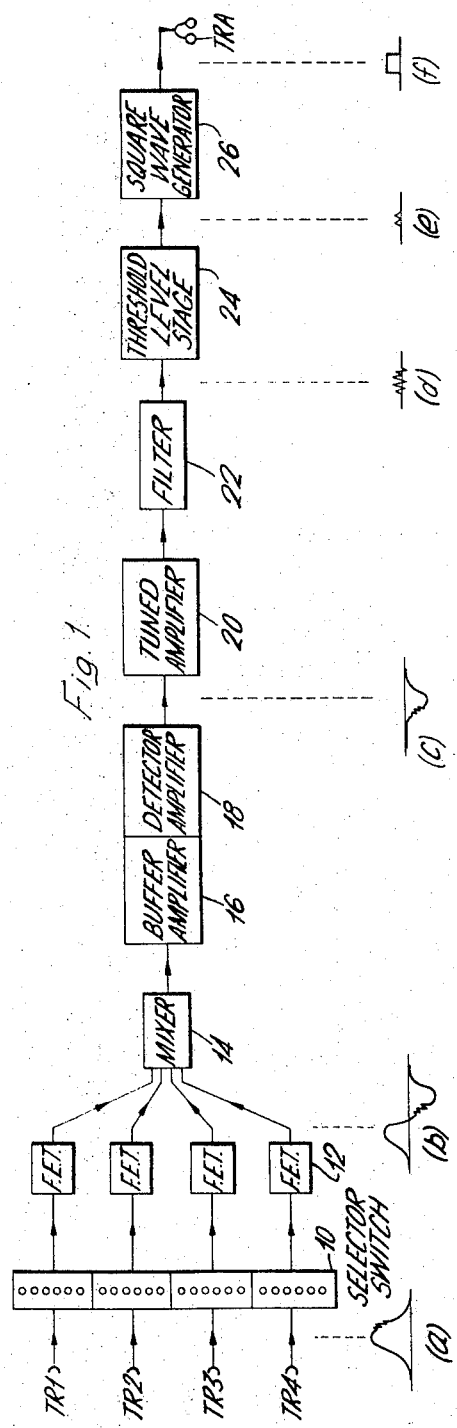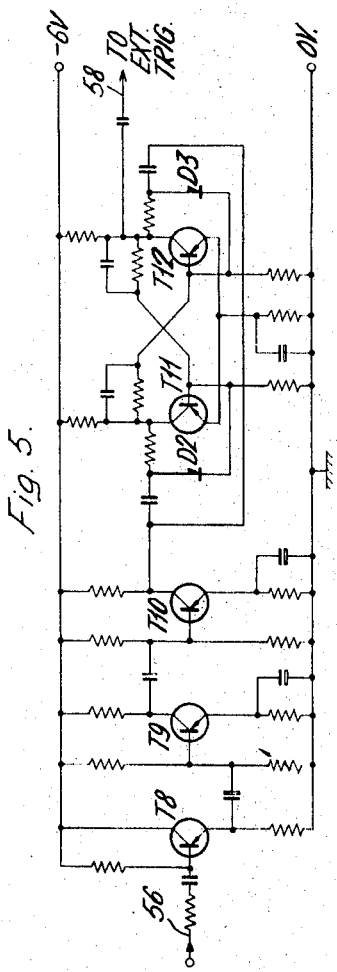

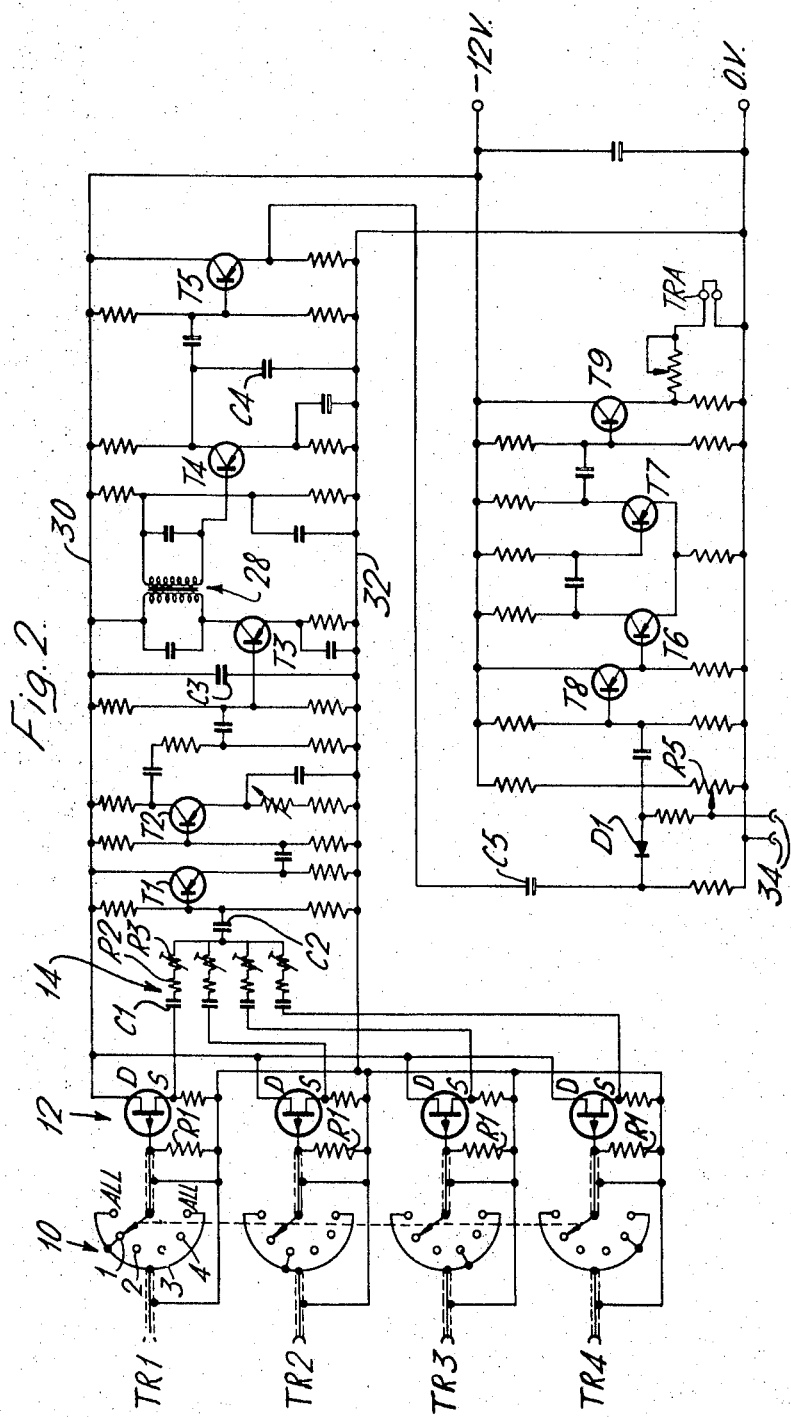

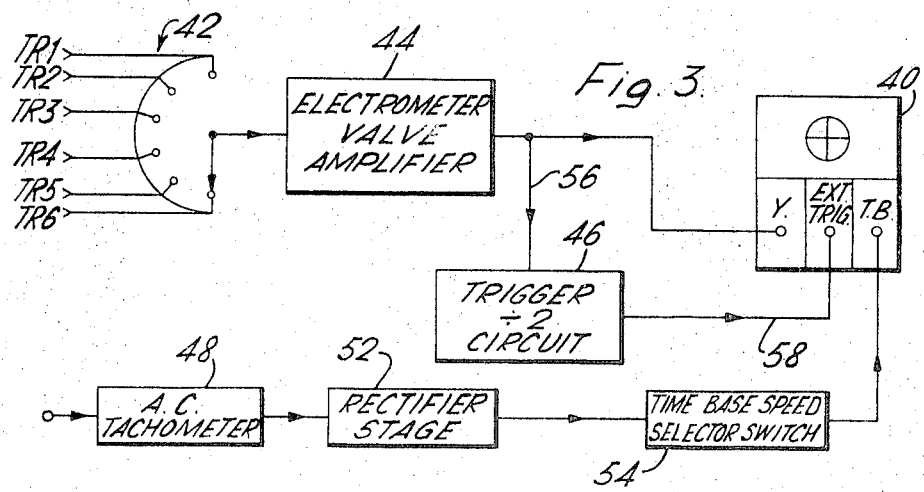
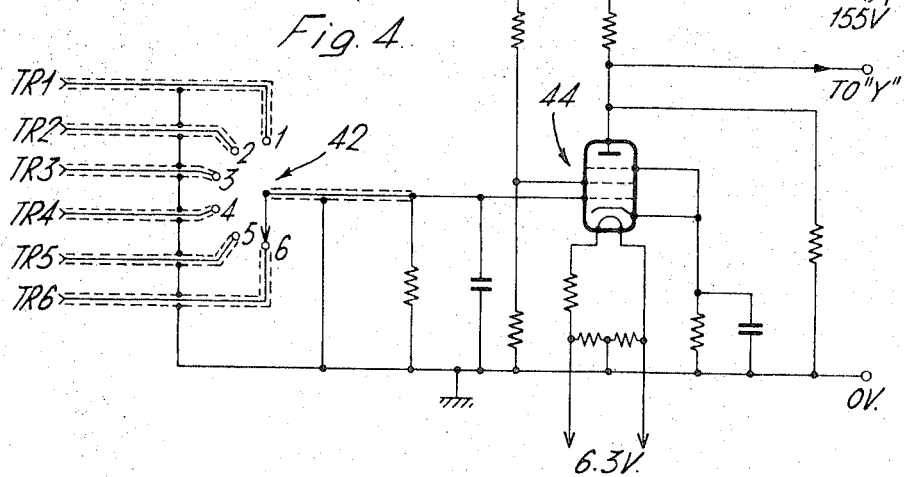
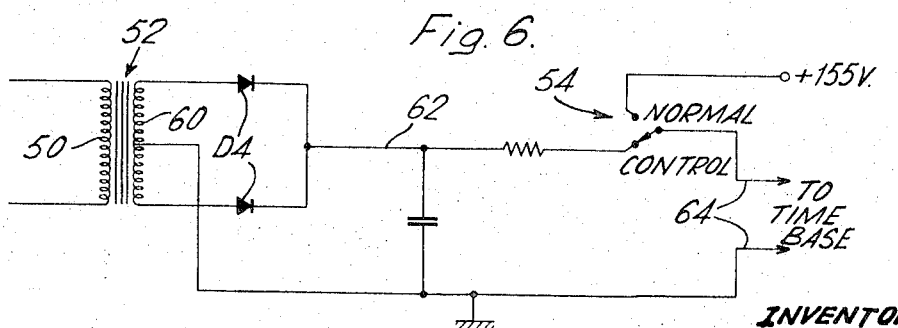

DETECTION OF KNOCK IN INTERNAL COMBUSTION ENGINES

This invention relates to the detection of spark knock in spark ignition engines, and is particularly concerned with detecting knock in multicylinder engines running at high speeds when normal aural detection of the phenomenon by an observer listening to the engine cannot be made easily, if at all, on account of the volume of background noise.

The occurrence of knock in a spark ignition engine may be due to one or more of a number of factors, such as ignition advance, compression ratio, or specific power output of the engine, and the composition of the fuel. At high engine speeds it is difficult for even a skilled observer to hear knock due to the high level of extraneous noise from the engine and/or the wind and tyre noise from the vehicle, and thus this form of abnormal combustion may remain undetected.

In practice, the simple aural technique of detecting knock has generally involved adjusting the ignition spark setting from within the car whilst it is driven on the road or on a vehicle dynamometer. The observer listens for audible knock and records the spark advance for knock and also the engine speed over a range of driving conditions. The data can then subsequently be graphically analyzed. This technique is time-consuming, tiring and the results tend to vary between individual observers.

It is an object of the present invention to provide apparatus for detecting the presence of knock at relatively high speeds, and which, in addition, can also be used in lower engine speed ranges. In the former case, i.e., at high speeds, knock can often be detected by means of the present invention three to four crankshaft degrees earlier than with a simple aural assessment by a skilled observer. The apparatus can be used either in the laboratory on a vehicle dynamometer or in test vehicles on the road.

The present invention concerns apparatus for effecting both aural or visual detection of the occurrence of knock, the aural system providing a sound indication, for example over a set of headphones, and the visual system providing a display, for example on a cathode-ray tube.

In accordance with the present invention, apparatus for detecting the presence of knock in a spark ignition engine comprises at least one transducer arranged to provide signals indicative of pressure in the engine, circuit means arranged to receive said transducer output signals and to provide electrical signals representative of any knock in the engine, and indicator means providing from said electrical signals an aural or visual indication of the presence of knock.

In the aural system, the electroacoustic indicator means preferably comprises a pair of headphones which can be worn by an observer.

Again in the aural system, said circuit means may include a tuned amplifier, a filter, and a threshold level detector arranged to gate out unwanted signals and feed constant amplitude pulses representative of knock to the electroacoustic transducer.

In the visual system, said circuit means preferably comprises an electrometer valve arranged to receive the transducer output signals, and said indicator means preferably comprises a cathode-ray tube, having one pair of plates connected to the electrometer valve output. The visual system may include variable voltage control means connected to the time base of the cathode-ray tube and arranged to maintain the time base voltage proportional to the engine speed.

In both the aural and visual systems the engine transducer or transducers pick up signals indicative of the pressure in the combustion chambers. However, in the aural system these are preferably converted to signals indicative of the rate of change of pressure in the combustion chambers as will be described later.

In order that the invention may be fully understood, two embodiments thereof will now be described by way of example and with reference to the accompanying drawings, in which:

FIG. 1 is a block schematic diagram and waveform diagram showing an embodiment of an aural knock detection system in accordance with the invention;

FIG. 2 is a circuit diagram of the embodiment of FIG. 1;

FIG. 3 is a block schematic diagram of an embodiment of a visual knock detection system in accordance with the invention;

FIG. 4 is a circuit diagram of the electrometer valve amplifier of FIG. 3;

FIG. 5 is a circuit diagram of the trigger divide-by-two circuit of FIG. 3; and, FIG. 6 is a circuit diagram of the rectifier stage and time base speed selector switch of FIG. 3.

Referring first to FIG. 1, this shows a selector switch 10 consisting of four sections or wafers each having a number of switch positions, as shown more clearly in FIG. 2. Each switch section is connected via a coaxial cable to a transducer TR1, TR2, TR3, TR4, preferably of the piezoelectric type, which is mounted in one of the sparking plugs in the engine under test so as to be in communication with the interior of the combustion chamber. The knock detector system can thus be connected via the switch 10 to any one or combination of the combustion chambers. The transducers used are arranged to provide signals indicative of the pressure in the combustion chambers, as shown in FIG. 1a, and these signals are differentiated as will be described more clearly later. If knock occurs in one of the combustion chambers the pressure signal waveform will have one or more sharp peaks at a position just beyond the maximum amplitude crests of the waveform.

The output signals from the separate sections of the selector switch 10 are fed to respective field-effect transistors 12 of the junction-gate type and their outputs are coupled to a mixer 14. From the mixer 14 the signals are applied to a buffer amplifier 16 and a detector amplifier 18 and thence to a tuned amplifier 20 which is set to be resonant at approximately 3kc./s. The signals therefrom are filtered in a filter 22 of suitable characteristics and are passed to a threshold level stage 24. The output of this stage is applied to a square wave generator 26 which produces constant amplitude pulses which can then be detected with an electroacoustical transducer TRA such as a pair of headphones, so as to give an aural indication of the presence of knock.

Referring now to FIG. 2, this shows the circuit details of the system of FIG. 1. The selector switch outputs are fed to the transistors 12 over coaxial cables, as are its inputs, in order to screen the transducer output signals from external noise. A relatively large resistance R1, for example 4.7 MΩ, is connected across the gate/source terminals of each field-effect transistor 12 and this in conjunction with the self-capacitance of the piezoelectric elements of the transducers TR1, TR2, TR3, TR4 effects a differentiation of the respective transducer output signals. Differentiation is effected at this point in order to suitably reduce the input impedance to the instrument and thereby increase the frequency response of the FET circuits, and also in order to reduce the noise pickup at the input of the instrument. The output signals taken from the source terminals of the respective transistors 12 are of the form shown in FIG. 1b where the knock peaks are located on the negative-going portions of the waveform. These transistor output signals are fed to the mixer 14 which consists of a capacitance C1 and two resistances R2 and R3 connected in series in each channel with a common output terminal for the four channels.

The common output is coupled via a capacitor C2 to the buffer amplifier 16, which comprises a transistor T1 and associated biasing resistances, and the detector amplifier 18, which comprises a transistor T2 and associated biasing resistances. These amplifiers 16 and 18 serve to gate out the positive-going portions of the mixer output signal and amplify the remaining negative-going portions including the knock peaks, as shown in FIG. 1c. The detector amplifier output is connected to the tuned amplifier 20 which comprises a transistor T3 having a resonant LC-circuit 28 forming the collector load. This resonant circuit 28 is, as mentioned before, preferably tuned to about 3kc./s. A capacitor C3 is connected between the negative rail 30 and earth rail 32 just in advance of the tuned amplifier 20 and serves to cut out any ignition signals which have been induced in the power supply line.

The tuned amplifier output is fed through a further amplifying transistor T4 to the filter 22 which includes the output resistance of transistor stage T4 and a capacitor C4. The filtered signal, now of the form shown in FIG. 1d, is applied to the base of a transistor T5, and the output signal is taken from the emitter thereof and is coupled via an electrolytic capacitor C5 to the threshold level stage 24. This stage comprises a diode D1 and a resistance network which includes a variable resistance R5 by means of which the threshold level can be adjusted. A monitoring voltmeter (not shown) can be connected across the pair of terminals 34 if desired. The signals from the threshold level stage 24, as shown in FIG. 1e, correspond to knock peaks exceeding a certain amplitude, and are fed to the square wave generator 26 to produce uniform amplitude output pulses, as shown in FIG. 1f, for the electroacoustic transducer TRA. The square wave generator 26 comprises a monostable multivibrator of transistors T6 and T7 with input and output transistors T8 and T9 respectively. The multivibrator transistors T6 and T7 have their emitters connected to earth and the collector of transistor T6 is capacitance-coupled to the base of transistor T7.

The square wave output signals from the generator 26 are heard in the headphones or equivalent transducer TR as a series of clocks indicative of knock. It is not normally desired to count the number of knock peaks and in such circumstances it is not necessary to ensure that each peak from the threshold level stage 24 corresponds to a single square wave pulse. If it is desired to count the knock peaks, suitable delay and counting circuits can be included in the system.

An alternative system for detecting knock is illustrated in FIG. 3. This visual display system includes an oscilloscope 40 and only has provision for monitoring one combustion chamber of the engine at a time. A selector switch 42 enables the circuit to be connected to one of the piezoelectric pressure transducers TR1, TR2, ... TR6 mounted, as in the first embodiment, in the sparking plugs in respective ones of the combustion chambers. In this embodiment, the transducers each provide a true pressure signal and there is no differentiation of the signal as in the first embodiment. The output from the selector switch 42 is fed to an electrometer valve amplifier 44 which is more fully shown in FIG. 4. The output signal therefrom is applied to the Y deflection plates of the oscilloscope 40 and also to a trigger divide-by-two circuit 46, shown more fully in FIG. 5, which is connected to the external trigger control input of the oscilloscope.

In order to automatically adjust the time base speed in the oscilloscope display for differing engine speeds it is essential that the voltage applied to the time base of the oscilloscope should be directly proportional to the speed of the engine under test. For this reason a variable voltage supply system is provided. An AC tachometer 48 is connected mechanically to the engine and its electrical output is connected across the primary winding 50 (FIG. 6) of a transformer 52. The transformer output is connected to a time base speed selection switch 54 and the output voltage therefrom is coupled to the time base of the oscilloscope 40.

As can be seen from FIG. 4, the electrometer valve amplifier is of a well-known type and its construction and method of operation will not therefore be described in detail. However, it should be noted that the heater of the valve is preferably maintained at 3 to 4 volts in order to provide a suitably high input impedance. Screened coaxial cables are again used between the switch 42 and the transducers and between the switch and the valve amplifier.

FIG. 5 shows the detailed circuitry of the trigger divide-by-two circuit 46. The input signal from the electrometer valve amplifier 44 on line 56 is fed through a series of three transistors T8, T9 and T10 and then to the signal dividing circuit. This comprises a symmetrical circuit of two transistors T11 and T12 each having a diode D2, D3 respectively associated therewith to ensure correct routing of the input trigger pulse, and each having their respective collector electrodes coupled to the base of the other transistor. This circuit thus provides the necessary output signal on line 58 for the external trigger of the oscilloscope 40.

Referring to FIG. 6, the transformer 52 which has its primary winding 50 connected to the output of the AC tachometer 48 has its secondary winding 60 divided into two sections by a center tap connected to earth. The opposed ends of the secondary winding 60 are each coupled via a diode D4 to a common line 62 which connects with one contact of the time base speed selection switch 54.

The other switch contact is connected to a relatively high positive potential derived from the oscilloscope 40. This connection is to allow the 155 volt line of the oscilloscope time base to be broken to allow the tachometer signal to be injected when normal operation of the oscilloscope is not required. The output leads 64 from the switch thus provide a variable voltage supply proportional to the engine speed for the oscilloscope time base speed control circuit. A visual display of knock can thus be obtained on the oscilloscope, even at high speeds when the phenomenon is masked by extraneous engine noise.

We claim:

1. Apparatus for detecting the presence of knock in a spark ignition engine comprising:
  a. at least one transducer arranged to provide signals indicative of pressure in the engine;
  b. circuit means connected to receive said transducer output signals and providing electrical signals representative of any knock in the engine, said circuit means comprising an electrometer valve connected to receive the pressure-indicative transducer output signals;
  c. indicator means comprising a cathode-ray tube having one pair of deflection plates connected to the electrometer valve output so as to receive said knock-representative electrical signals and providing from said signals an analogue visual indication of any knock; and
  d. variable voltage control means connected to the time base of the cathode-ray tube and arranged to maintain the time base voltage proportional to the engine speed comprising:
     i. an AC tachometer mechanically coupled to the engine;
     ii. a transformer having the tachometer output connected across its primary winding; and
     iii. switch means connected across the output winding of said transformer and having connection to the line base of the cathode-ray tube.

2. Apparatus for detecting the presence of knock in a spark ignition engine comprising:
  a. input terminal means arranged to be connected to at least one pressure transducer mounted within a combustion chamber of said engine for direct reception of pressure waves generated in the chamber and adapted to provide signals indicative of pressure in the engine;
  b. differentiating means providing from said pressure-indicative signals a varying waveform representative of the rate of change of pressure in the engine;
  c. gating means including a tuned amplifier resonant at a frequency characteristic of knock operative to extract from said varying waveform only those peaked portions thereof representative of knock;
  d. a threshold level detector coupled to said gating means and effective to provide an output only in response to knock peaks exceeding a predetermined amplitude;
  e. signal generator means connected to said threshold level detector and arranged to provide constant amplitude pulses in proportion to the number of peaks in the output from said threshold level detector; and
  f. electroacoustic indicator means connected to receive said constant amplitude pulses and providing therefrom an aural indication of any knock.

3. The apparatus for detecting the presence of knock in a spark ignition engine as claimed in claim 2 wherein said tuned amplifier is resonant at approximately 3kc./s.